March 17, 1931.  W. W. BROWN  1,797,127
ENGINE
Filed Jan. 22, 1926   6 Sheets-Sheet 1

William W. Brown
INVENTOR
BY Victor J. Evans
ATTORNEY

WITNESS:

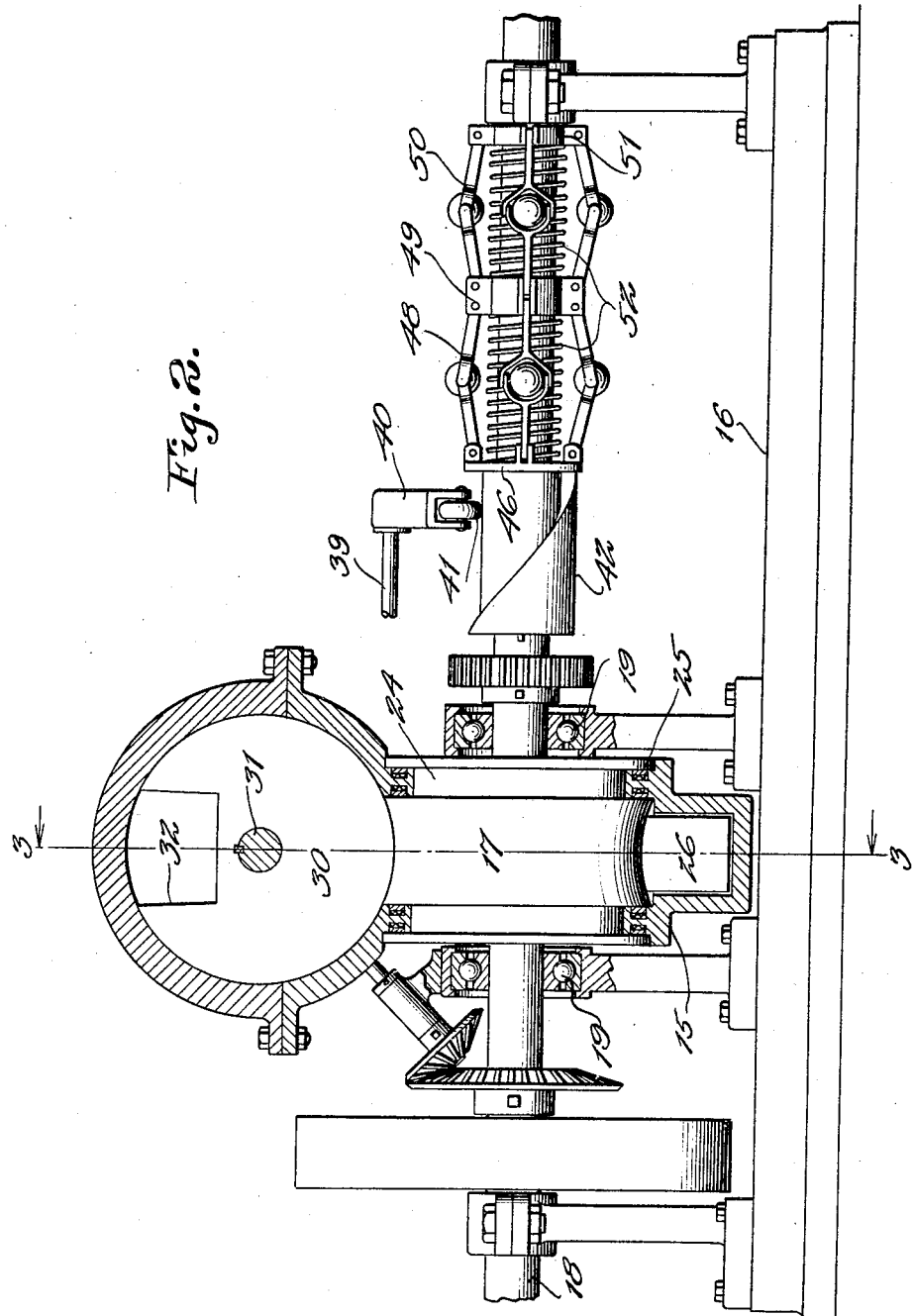

March 17, 1931.    W. W. BROWN    1,797,127
ENGINE
Filed Jan. 22, 1926    6 Sheets-Sheet 3
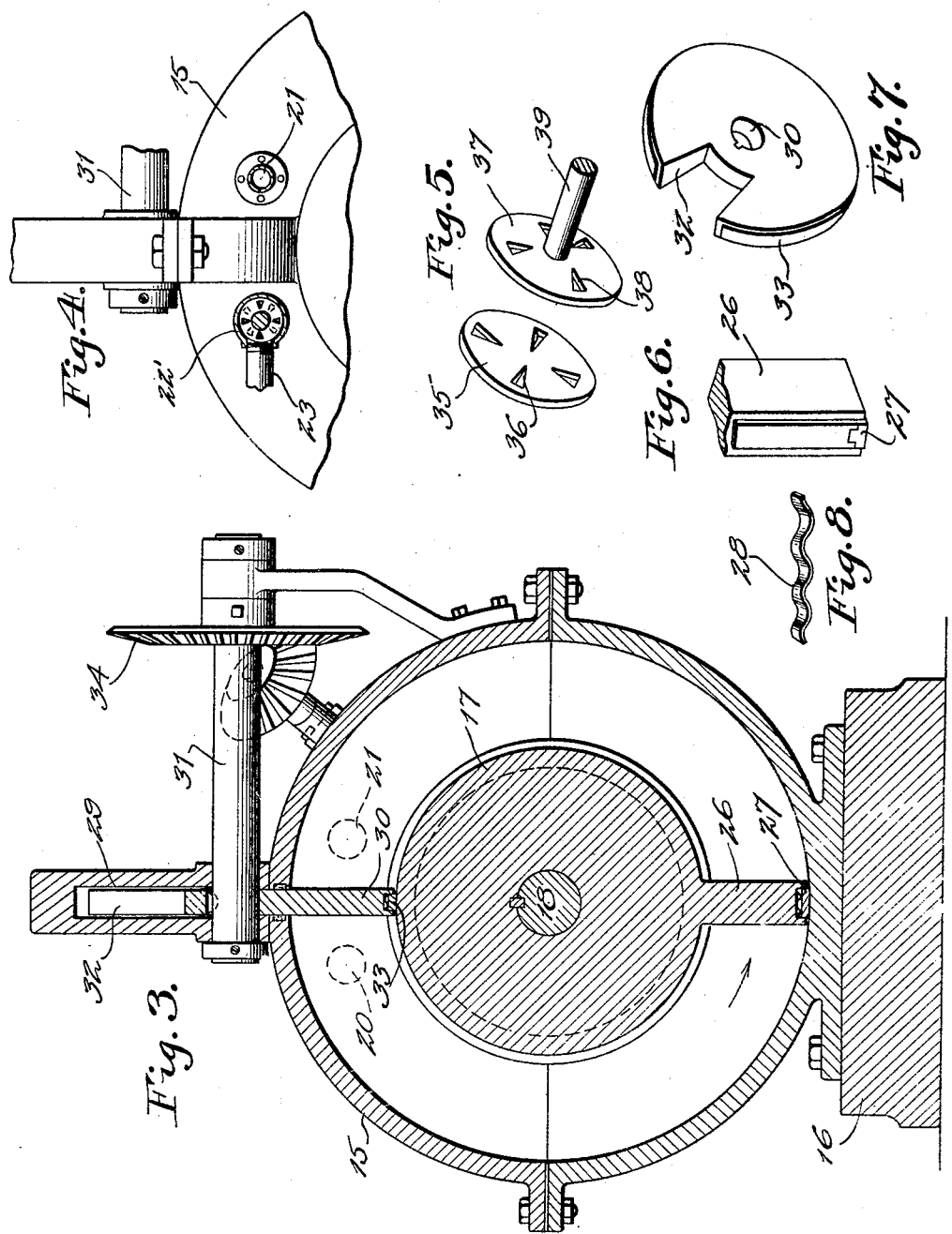
William W. Brown
INVENTOR

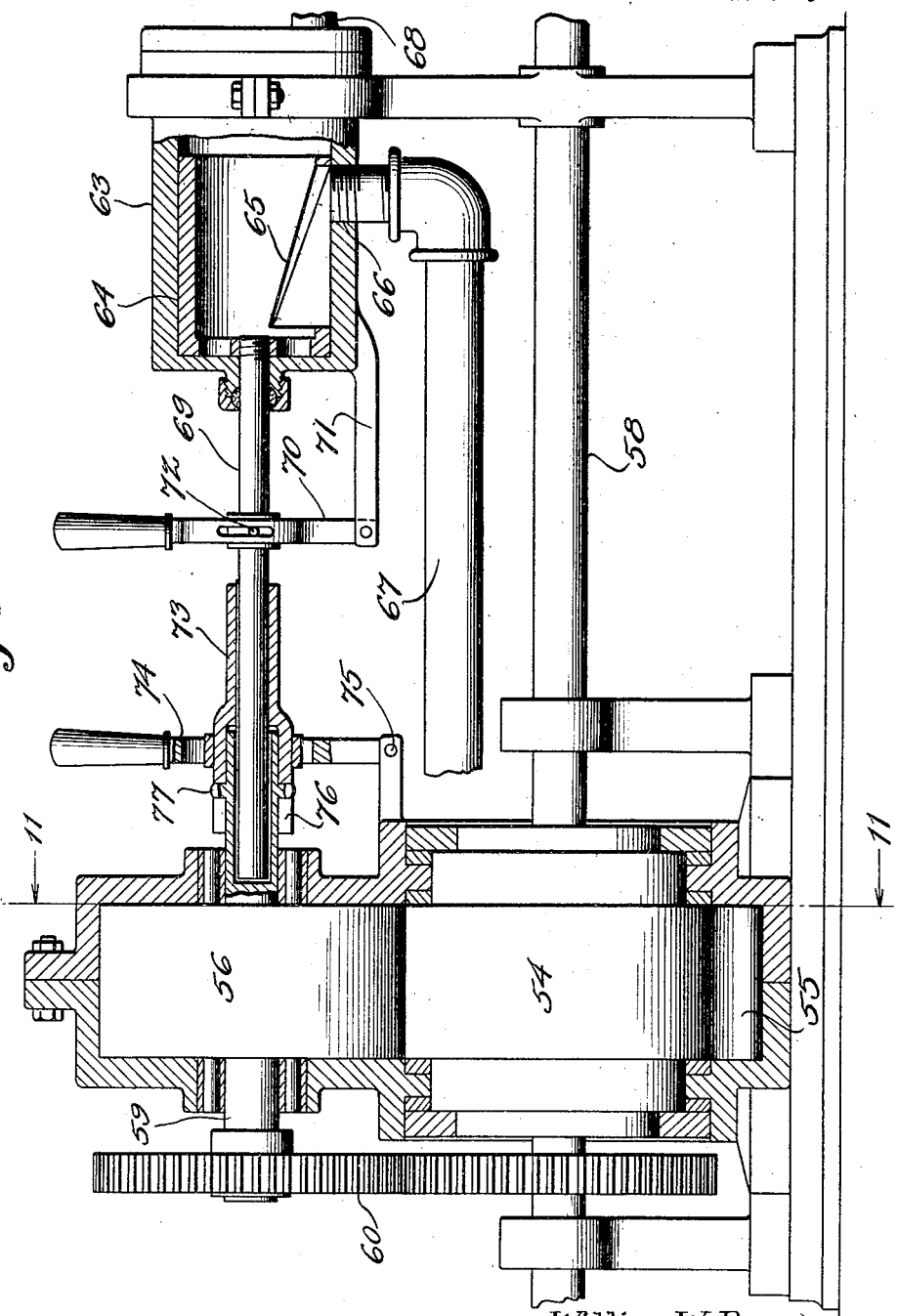

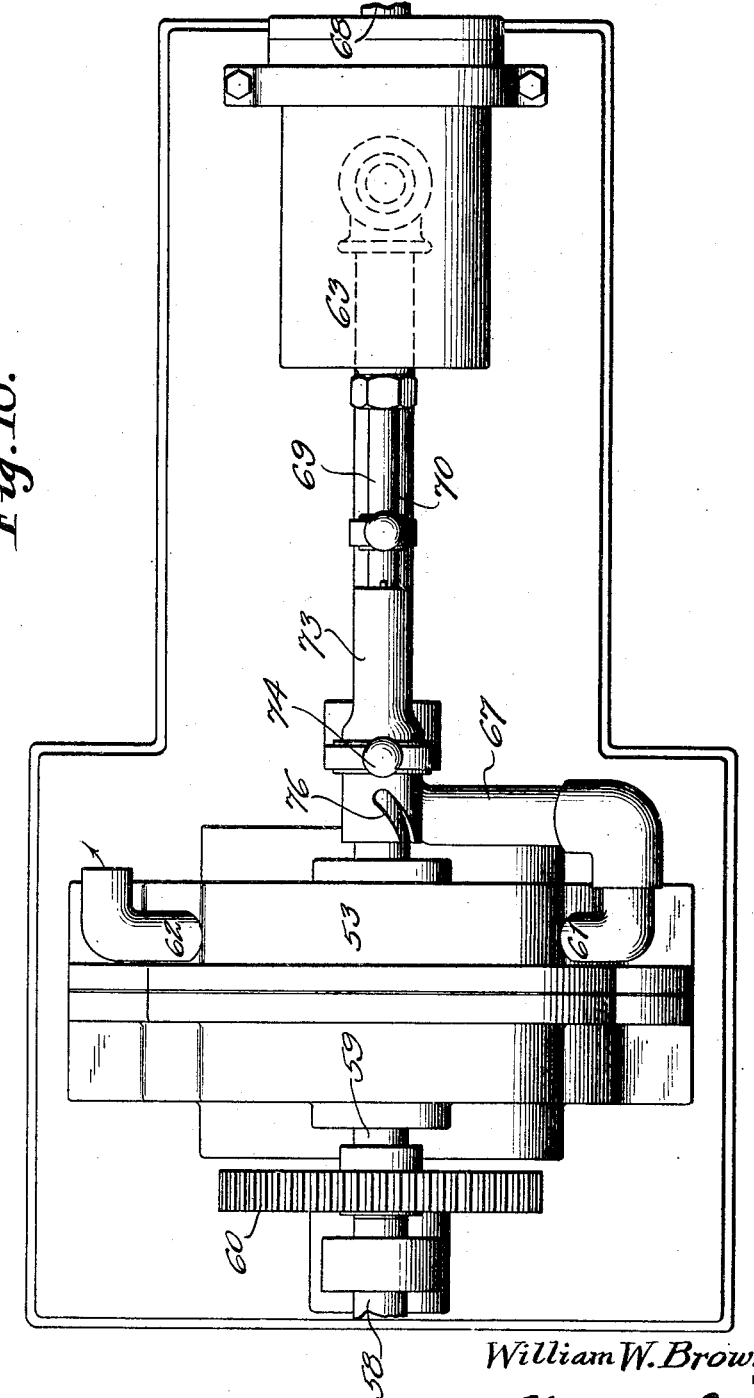

March 17, 1931.  W. W. BROWN  1,797,127
ENGINE
Filed Jan. 22, 1926   6 Sheets-Sheet 6
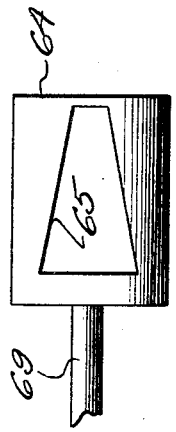
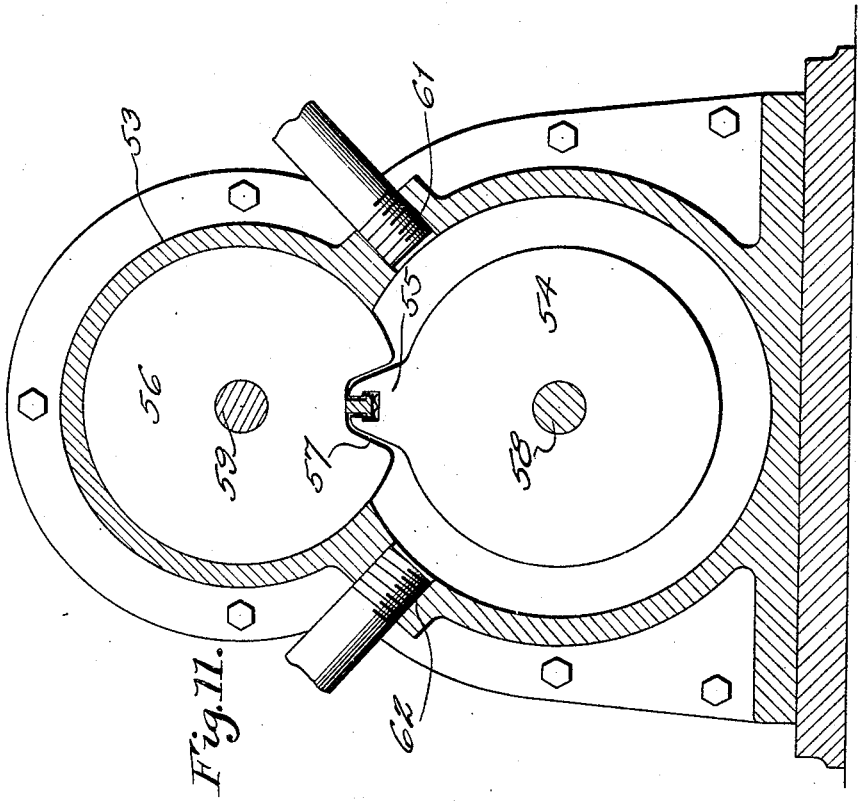
William W. Brown
INVENTOR
BY Victor J. Evans
ATTORNEY
WITNESS:

Patented Mar. 17, 1931

1,797,127

UNITED STATES PATENT OFFICE

WILLIAM W. BROWN, OF CARUTHERSVILLE, MISSOURI

ENGINE

Application filed January 22, 1926. Serial No. 83,062.

This invention relates to rotary expansion engines capable of use with steam or other expansible fluid and is an improvement upon an engine disclosed in application numbered 607,749, filed by me December 18, 1922.

The present invention, like that disclosed in the application mentioned, aims to provide means for adjusting the fluid feed proportionate to the engine load, so that as the load varies, the fluid feed will be automatically varied and thus insure an even operation of the engine and of the machine or mechanism for which power is furnished.

With the above and other objects in view, the invention further includes the following novel features and details of construction, to be hereinafter more fully described, illustrated in the accompanying drawings and pointed out in the appended claims.

In the drawings:—

Figure 2 is a sectional view taken longitudinally of the drive shaft of the engine.

Figure 3 is an enlarged sectional view on the line 3—3 of Figure 2.

Figure 4 is a fragmentary view substantially on the line 4—4 of Figure 1.

Figure 5 is a perspective view of the fluid inlet valve showing the parts of the valve separated.

Figure 6 is a fragmentary perspective illustrating the engine piston.

Figure 7 is a similar view of the rotary abutment.

Figure 8 is a like view of one of the packing springs.

Figure 9 is a view similar to Figure 2 but illustrating a modified form of the invention.

Figure 10 is a plan view of the form of invention shown in Figure 9.

Figure 11 is a sectional view taken substantially on the line 11—11 of Figure 9.

Figure 12 is a detail view of the rotary valve member.

Figure 13 is a detail view of the valve adjusting sleeve.

Figure 1:
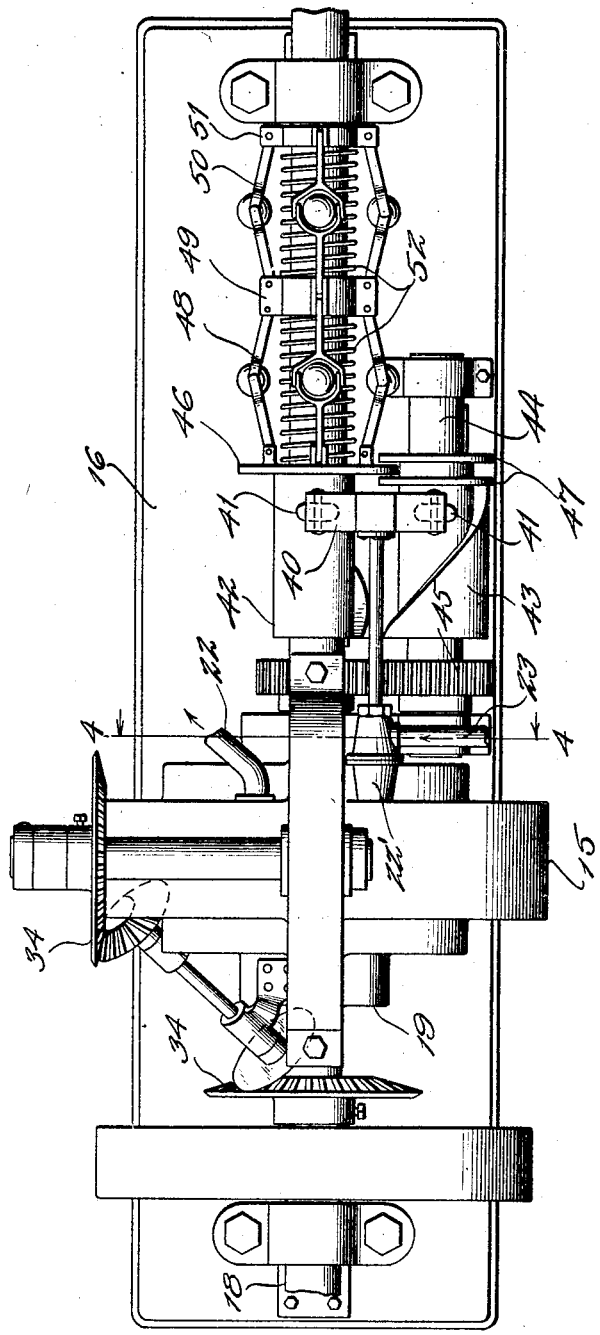
Figure 1 is a top plan view of an engine and its valve mechanism constructed in accordance with the invention.

Referring to the drawings in detail and especially to Figures 1 to 8 inclusive, the reference character 15 indicates the engine housing. This housing is of suitable construction and may be mounted upon a suitable base or support 16. The housing 15 is of cylindrical shape and accommodates a rotor 17, the latter being fast upon a shaft 18 which is mounted in suitable bearings 19 at opposite ends of the engine housing. The housing is provided with a fluid inlet port 20 and an exhaust port 21, the latter preferably having an exhaust pipe 22 extending therefrom. The port 20 is in communication with one end of a valve casing 22' through which fluid is admitted to the engine cylinder by means of a fluid supply pipe 23.

The rotor 17 is provided with spaced circumferential grooves 24 which accommodate suitable packing 25, while a piston 26 which extends radially from the rotor 17 is also provided with suitable packing 27. The packing is yieldingly held in proper position by means of suitable springs, such for example as illustrated at 28 in Figure 8 of the drawings.

Extending from the engine housing 15 and communicating with the engine cylinder is a chamber 29 within which rotates an abutment 30. This abutment is carried by a shaft 31 and is provided with a recess 32 designed for the passage of the piston 26. The abutment 30 is provided with peripheral packing 33.

Steam or other expansible fluid is admitted to the cylinder through the inlet port 20 and expands between the piston 26 and the abutment 30 and acts to force the piston around the cylinder, the rotary abutment 30 being so timed that its recess 32 will be properly positioned to permit of the passage of the piston so that the latter may be positioned to receive the next charge of fluid. The expanded fuel passes out through the exhaust port 21.

In order to rotate the abutment 30, the shaft 18 drives the shaft 31 through the medium of gears 34, the latter being of a proper ratio to properly time the abutment.

Admission of fluid to the engine cylinder is regulated by means of an intake valve. This valve is positioned within the valve casing 22' and comprises a stationary member 35 which is provided with spaced openings 36 and a movable member 37 which is provided with spaced openings 38, the openings 38 being adapted to be moved into and out of register with the openings 36. The movable member 37 of the valve is mounted upon a rock shaft 39 and this shaft carries at its outer end a rocker arm 40. The arm 40 carries at each end a roller 41 which is adapted to engage the surfaces of rotary cams 42 and 43. The cams 42 and 43 are of like construction, the cam 42 being mounted upon the shaft 18, while the cam 43 is mounted upon a counter-shaft 44 which is driven from the shaft 18 by means of gearing 45. While the cams 42 and 43 are of like construction, they are reversely arranged, that is, they are so arranged that the reduced diameter of one cam will be engaged by the relatively large diameter of the other cam so that as the cams rotate, a rocking movement will be imparted to the rocker arm 40 and the openings 36 and 38 alternately brought into and out of register to alternately open and close the valve. Thus, fluid will be alternately admitted and cut off from the engine cylinder and the engine operated in the manner previously explained.

In order to automatically vary the amount of fluid admitted to the engine cylinder at each operation of the valve so as to compensate for a variance in engine load, the cams 42 and 43 are capable of being adjusted longitudinally upon their respective shafts so that the rollers 41 of the rocker arm will engage the high and low portions of the cams at different times and thus vary the degree of opening of the valve and regulate the amount of fluid admitted to the engine. For this purpose, one of the cams, for example, the cam 42, carries a disk 46 which engages between spaced disks 47 carried by the cam 43. The disk 46 has pivotally secured thereto weighted toggle levers 48 which are in turn pivotally secured to a collar 49 slidable longitudinally of the shaft 18. The collar 49 is connected by means of weighted toggle levers 50 to a stationary collar 51. As the speed of the engine increases, the weighted toggle levers 48 and 50 will be moved outward by centrifugal force and will thus move the cams 42 and 43 longitudinally of the shaft and change their positions with respect to the rollers of the rocker arm 40. This movement will provide for a lesser time of opening of the fluid intake valve and the amount of fluid admitted to the engine cylinder will be accordingly decreased. As the engine load increases the tendency to slow down the engine, the weighted arms 48 and 50 will move inward under the action of springs 52 upon the shaft 18, so that the cams 42 and 43 will be again moved with respect to the rocker arm so as to open the fluid intake valve for a greater time and admit a greater amount of fluid.

In Figures 9 to 13, the engine housing 53 accommodates a rotor 54 which carries a piston 55 and also accommodates a rotary abutment 56. This abutment is provided with a notch 57 to receive the piston 55 and permit the latter to pass the abutment. The rotor 54 is mounted upon a shaft 58, while the abutment 56 is mounted upon a shaft 59, the said shafts being connected by gears 60 of a ratio to provide proper operation. The casing 53 is provided with intake and exhaust ports 61 and 62 respectively.

The valve for controlling the admission of fluid to the engine through the intake port 61 comprises a casing 63, while slidingly and rotatably mounted within this valve casing 63 is a valve member 64. This valve member is hollow and is provided with an opening 65 which is adapted to register with a port 66 provided in the casing 63. This port 66 is in communication with the port 61 by means of a pipe 67. A fluid intake port 68 is provided in the casing 63.

The valve member 64 is secured to one end of a shaft 69 and the latter is coupled to the shaft 59 in a manner to rotate the shaft 69 but permit of longitudinal sliding adjustment of said shaft 69. A lever 70 which has one end pivotally secured to a bracket arm 71, is suitably connected to the shaft 69 as shown at 72 so as to permit the shaft to rotate with respect to the lever. By moving the lever 70 pivotally, the shaft 69 may be longitudinally moved to adjust the valve member 64 and so position the opening 65 with respect to the port 66 as to decrease or increase the amount of fluid passing through the valve and thus control the speed of operation of the engine.

The shaft 69 has secured thereon a sleeve 73 which has associated therewith a lever 74, the latter being pivotally mounted as shown at 75. This sleeve is provided with diametrically located curved slots 76 which receive pins 77 extending from the shaft 59. By moving the lever 74 pivotally, the valve member 64 may be rotatably adjusted so as to time the operation of the valve member with respect to the engine.

The invention is susceptible of various changes in its form, proportions and minor details of construction and the right is herein reserved to make such changes as properly fall within the scope of the appended claims.

Having described the invention what is claimed is:—

1. In an engine, a rotary shaft bored longitudinally at one end, a valve casing having communication with the engine cylinder, a valve member operating in said casing and having a variable shaped port, a valve shaft secured to one end of the valve and having its other end slidably and rotatably received by the bore of the first mentioned shaft, means for sliding said valve shaft to adjust the valve member axially to regulate the amount of steam admitted, and means for rotating said shaft to regulate the time of opening and closing the valve with respect to the engine.

2. In an engine, a casing, a shaft journaled thereon and having a longitudinal bore at one end, a valve casing having communication with the engine, a valve member operating therein and having a variable shaped port, a shaft secured to one end of the valve and having its other end slidably and rotatably received by the bore of the first mentioned shaft, means for sliding the valve shaft to adjust the valve axially and thereby regulate the amount of steam admitted, a sleeve slidably mounted on the valve shaft, and cooperating means carried by the sleeve and the first mentioned shaft to rotate the valve on movement of the sleeve in one direction, whereby the valve may be properly timed.

3. In an engine, a casing, a shaft journaled thereon and having a longitudinal bore at one end, a valve casing having communication with the engine, a valve member operating therein and having a variable shaped port, a shaft secured to one end of the valve and having its other end slidably and rotatably received by the bore of the first mentioned shaft, means for sliding the valve shaft to adjust the valve axially and thereby regulate the amount of steam admitted, a sleeve slidably mounted on the valve shaft, diametrically opposed lugs projecting from the first mentioned shaft, and said sleeve having curved slots adapted to receive said lugs and rotate the valve upon movement of the sleeve, whereby the timing of the valve can be regulated.

4. A valve mechanism for a rotary motor having a hollow shaft, said mechanism including a valve casing having an inlet opening, a cylindrical valve both slidably and rotatably arranged in said casing and having a variable shaped port and including a shaft received by the hollow shaft of the motor, means for shifting the valve longitudinally of the casing, a pivotally mounted lever arranged at a right angle to said shaft of the valve, a sleeve slidable on the last mentioned shaft and actuated by said lever, said sleeve having curved slots opening at one end thereof, and opposed lugs projecting from the motor shaft and adapted to be received by said slots to rotate the valve upon movement of the sleeve in one direction, whereby the timing of the valve can be regulated.

In testimony whereof I affix my signature.

WILLIAM W. BROWN.